United States Patent Office 3,647,738
Patented Mar. 7, 1972

3,647,738
α-OLEFIN POLYMER COMPOSITIONS
George N. Foster, Somerville, N.J., assignor to Union Carbide Corporation, New York, N.Y.
No Drawing. Filed Nov. 3, 1970, Ser. No. 86,613
Int. Cl. C08k 1/44
U.S. Cl. 260—32.6                    13 Claims

ABSTRACT OF THE DISCLOSURE

α-Olefin polymer compositions characterized by affording films having a low coefficient of friction, a low blocking force, and no blooming have been developed by incorporating therein about 0.01 to 5.0% by weight of an amide having the formula:

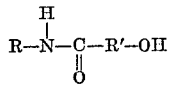

wherein R is an alkenyl radical having 18 to about 22 carbon atoms and R' is a divalent hydrocarbon radical containing 3 to 15 carbon atoms.

BACKGROUND OF THE INVENTION

This invention pertains to α-olefin polymer film forming compositions and in particular to those containing novel N-alkenyl hydroxy-substituted aliphatic acid amides.

A number of fatty acid amides and N-substituted fatty acid amides, as well as hydroxylated derivatives of both have been employed in α-olefin polymer compositions to impart high slip and low blocking characteristics to films prepared therefrom. As so often happens with polymer formulations, a modification which solves one problem simultaneously creates another. In the case of fatty acid amides which improve slip and/or blocking characteristics of α-olefin polymers they usually also impart undesirable blooming characteristics at the minimum concentrations at which these additives are used. Needless to say this effect renders such amide additives unsatisfactory for clear film forming α-olefin polymer compositions.

It is therefore an object of this invention to provide α-olefin polymer compositions which can be fabricated into films having low blocking and no bloom characteristics and high slip properties, that is, a low coefficient of friction.

It is a further object of this invention to provide α-olefin polymer compositions wherein the film properties enumerated in the preceeding paragraph exhibit themselves shortly after film formation that is within the first 24 hours following the film fabrication operation.

These and other objects will become apparent to those skilled in the art upon a reading of the disclosure which follows.

SUMMARY OF THE INVENTION

It has now been found that α-olefin polymer compositions attaining the objects of this invention can be obtained by blending therewith about 0.01 to 5.0% by weight of an amide having the formula:

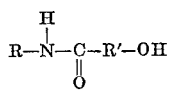

wherein R is an alkenyl radical having 18 to about 22 carbon atoms and R' is a divalent hydrocarbon radical containing 3 to 15 carbon atoms.

DESCRIPTION OF THE INVENTION

The α-olefin polymers of this invention include:

(1) Normally solid homopolymers and copolymers of olefinically unsaturated aliphatic hydrocarbons having the formula:

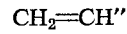

wherein R" is hydrogen or an alkyl group containing 1 to about 8 carbon atoms and having a density of about 0.88 to about 0.98;

(2) Normally solid ethylene/vinyl acetate copolymers containing about 1 to 35% by weight of vinyl acetate copolymerized therein;

(3) Normally solid ethylene/acrylic acid copolymers containing about 1 to 10% by weight of acrylic acid copolymerized therein;

(4) Normally solid ethylene/methacrylic acid copolymerized containing about 1 to 10% by weight of methacrylic acid copolymerized therein;

(5) And normally solid ethylene/alkyl acrylate or methacrylate copolymers containing about 1 to 35% by weight of alkyl acrylate or methacrylate copolymerized therein wherein the alkyl group contains 1 to about 6 carbon atoms.

The amides of this invention, some of which are novel composition of matter, can be prepared by reacting an alkenyl primary amine having 18 to about 22 carbon atoms with the lactone of an hydroxy aliphatic acid containing 4 to about 16 carbon atoms. It is preferred to use lactones of hydroxy aliphatic acids containing 4 to 6 carbon atoms. It is even more preferred to employ gamma-butyrolactone, delta - valerolactone, or epsilon-caprolactone.

Preferred alkenyl amines include oleyl amine, ricinoleyl amine, petroselinyl amine, vacenyl amine, gadoleyl amine, arachidonyl amine, 5-eicosenyl amine, 5-docosenyl amine, cetoleyl amine, erucyl amine, and the like. The preferred alkenyl amine is erucyl amine.

The homopolymers and copolymers of olefinically unsaturated aliphatic hydrocarbons described above are at least partially crystalline polymers. Of these it is preferred in the practice of this invention to employ the homopolymers of which polyethylene having a density of about 0.91 to about 0.96 and a melt index of about 0.01 to about 1000 dg./min. is most preferred. It is even more preferred to employ polyethylene having a melt index of about 0.01 to about 100 dg./min. and still more preferred to employ polyethylene having a melt index of about 0.1 to about 10 dg./min.

Other homopolymers which can be used include: polypropylene, polybutene-1, poly(4-methylpentene-1) and the like.

Exemplary of the copolymers of olefinically unsaturated aliphatic hydrocarbons which are preferred are ethylene-propylene copolymers, containing about 1 to about 99% by weight, based on the total copolymer, of propylene copolymerized therein, ethylene-butuene-1 copolymers containing about 1 to about 99%, based on the total copolymer of butene-1 copolymerized therein, ethylene-hexene-1 copolymers containing about 1 to about 99% by weight, based on the total copolymer of hexene-1 copolymerized therein and the like.

The homopolymers and copolymers of olefinically unsaturated aliphatic hydrocarbons referred to above can be made by either free radical catalyzed high pressure techniques or anionic catalyzed low pressure techniques known in the art and described in "Crystalline Olefin Polymers" Part I, by R.A.V. Raff and K.W. Doak, Interscience Publishers, NYC 1965 which is incorporated herein by reference.

The ethylene-acrylic acid interpolymers, ethylenemethacrylic acid interpolymers, ethylene-vinyl acetate interpolymers, and ethylene-alkyl acrylate methacrylate interpolymers of this invention can be made by the free radical, random interpolymerization of ethylene with the corresponding comonomer using methods well known in the art including bulk, solution, aqueous suspension, non-aqueous dispersion, and emulsion techniques in either batch or continuous processes.

The melt index of the ethylene/vinyl acetate copolymers of this invention can range from about 0.01 to 500 dg./min. with a rnge of about 0.2 to 20 dg./min. being preferred. These ethylene-vinyl acetate copolymers preferably contain about 1.5 to about 20% by weight of vinyl acetate copolymerized therein.

The melt index of the ethylene-acrylic or methacrylic acid interpolymers can be as low as about 0.01 dg./min. or as high as about 350 dg./min. with a preferred range being about 0.2 to 50 dg./min. and 0.5 to 10 dg./min. being most preferred.

It is preferred to use a melt index range of about 0.01 to 500 dg./min. for the ethylene/alkyl acrylate or methacrylate copolymers used in this invention although a range of about 0.2 to 20 dg./min. can be used if desired. Specific examples of these interpolymers include ethylene-methyl acrylate interpolymer, ethylene-ethyl acrylate interpolymer, ethylene-methyl methacrylate interpolymer, ethylenebutyl acrylate interpolymer, ethylene-isobutyl acrylate interpolymer, ethylene-propyl methacrylate interpolymer, ethylene-butyl methacrylate interpolymer, ethylene-t-butyl acrylate interpolymer, ethylene-t-butyl methacrylate interpolymer, ethylene-hexyl methacrylate interpolymer, ethylene-hexyl acrylate interpolymer, and the like.

Although a range of about 0.01 to 5.0% by weight of amide can be used in the practice of this invention, it is preferred to use about 0.02 to 0.5% with 0.05 to 0.2% being particularly preferred.

The above described α-olefin polymer compositions can be prepared by mixing techniques well known in the art as for example, dry blending, melt extrusion, Banburying and the like.

The compositions are particularly useful in this application for blown film and biaxially oriented film but are adaptable to the fabrication of films made by other techniques such as flat extrusion, solvent casting, and the like.

Melt index determinations were made according to the procedure described in ASTM D-1238-62T (Condition E).

Slip properties were determined by the coefficient of friction test method described in ASTM D-1894-63. The values given are units of force determined at a specified time interval after the films were prepared. Values given for each film indicate the coefficient of friction (COF) obtained at the outside of each film, since films were prepared by a tubular extrusion process from which the film is taken in tubular form, rolled in collapsed form and then slit into flat sheets prior to testing.

Blocking properties were determined in accordance with the procedure described in U.S. Pat. No. 3,028,355 (column 3, lines 50-69).

Bloom is defined as the visible exudation on the surface of a polymer of an additive present in that polymer. Various explanations have been proposed for this phenomena. One such explanation given in the Encyclopedia of Polymer Science and Technology, vol. 1, p. 531, Interscience Publishers, NYC, 1964, is: It is usually the result of incompatability of the additive with the polymer or of exclusion of additive or low-molecular-weight polymer upon the onset of crystallization of the polymer. Where the additive is a colorant in polyethylene it has been proposed in "Polythene" by A. Renfrew et al., p. 424, Interscience Publishers, NYC, 1960, that blooming results from the creation of a super-saturated solution of colorant in the polymer (or other component of the mix) during compounding with subsequent slow recrystallization on the surface. The simplest method of detecting blooming in the case of normally transparent films is to wipe the surface of the film and to examine the film itself for signs of increased transparency. Said method was used in evaluating the bloom characteristics of the compositions disclosed hereinafter and the ratings "yes" or "no" used to describe subjective observations made of the films prepared from these compositions.

The limitations and criticalities of the components of the α-olefin polymer composition of this invention are not arbitrary as will be seen from an examination of the working examples infra. Thus for example the amide additive component having the formula:

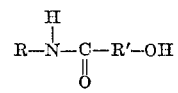

wherein R and R' are as defined previously must have an alkenyl radical as the R component and the total number of carbon atoms in the R component must be within the range of 18–22 carbon atoms. The R' component must contain at least 3 carbon atoms since amides containing two carbon and one carbon divalent hydrocarbon radicals were found to be unsatisfactory for the purposes of this invention. In addition the R and R' radicals must be in the position shown in the formula above and cannot be interchanged. Thus the N atoms of the amide must have R not R' as its substituents and conversely the —C=O group must have R' as its substituent which in turn must have a hydroxyl substituent. The necessity for this rigorous, definition of the amide additive is due to the fact that commercially acceptable α-olefin polymer compositions must have this precise combination of low coefficient of friction, low blocking force and low blooming characteristics in order to survive in the current competitive field. Thus prior art additives which have found ready acceptance in less demanding fields, such as for example, stearyl erucamide and erucamide satisfy only one or two but not all three of the above mentioned criteria. As a useful standard in today's α-olefin polymer market, the co-efficient of friction should be preferably 0.3 or lower although values of 0.38 or 0.39 can be tolerated if the other criteria are outstanding. The blocking force should be 10 or less grams and the films prepared from these ethylene polymer composition should show no evidence of bloom.

Not only is the structure of the amide additive critical in meeting this triple standard outlined above but so also is the qualitative and quantitative make-up of the α-olefin polymers themselves. In other words, the efficiency of the amide additives used in this invention is restricted to those α-olefin polymers specifically recited. Thus as to the homopolymers of ethylene useful in this invention they are limited to so-called low density and medium density polyethylenes. As to ethylene copolymers, such as, ethylene/acrylic acid or methacrylic acid copolymers the amide additives delineated above are effective only with those copolymers containing about 1 to 10% of acrylic or methacrylic acid copolymerized therein. These unpredictable phenomena can be interpreted as being due to the complexities involved in achieving a compatible mixture of heterogeneous substances in fine balance so that there is just enough migration of additive to the surface of films fabricated from the α-olefin polymer compositions to achieve satisfactory slip and blocking properties without gross migration to the point where additive appears on the surface of the film as a readily detectable dust or bloom. The art has not progressed to a point, despite the number of products and publications in this field, to predict the parameters established in this invention with any degree of signicant confidence.

The invention is further described in the examples which follow. All parts and percentages are by weight unless otherwise specified.

EXAMPLE 1

Preparation of N-oleyl-6-hydroxy caproamide 10 grams (0.0877 mol) of episilon caprolactone and 22.3 g. (0.0935 mol) of oleyl amine were charged to a 25 x 200 mm. test tube and mixed with a glass stirring rod. The test tube was then heated at 145° C. for 2 hours in a silicone oil bath. The product was then poured into 100 ml. of o-xylene and the resultant solution poured into 200 ml. of acetone whereupon N-oleyl-6-hydroxy caproamide precipitated. This product was recovered by filtration, washed with acetone, and dried in a vacuum oven. The yield of N-oleyl-6-hydroxy caproamide amounted to 6.9 grams (28.9% yield based on epsilon-caprolactone charged). The structure of this compound, represented by the formula $C_{18}H_{34}NHCO(CH_2)_4—CH_2OH$, was confirmed by infrared analysis showing disappearance of the absorption bands at about 5.75 microns for epsilon-caprolactone and appearance of an amide absorption band at about 6.1 to 6.2 microns.

EXAMPLE 2

Preparation of N-erucyl-6-hydroxy caproamide

A three liter, round-bottom flask equipped with a stirrer, thermometer and reflux condenser was charged with 804.15 g. (2.5 mols) of erucyl amine and 285.4 g. (2.5 mols) of epsilon-caprolactone and heated for eight hours at 80° C. under an atmosphere of nitrogen. Recrystallization of the product from isopropanol afforded a yield of 871.2 g. (79.9%) of N-erucyl-6-hydroxy caproamide. This material showed an elemental analysis of 76.6%, C; 12.6%, H; 3.2%, N; and 7.9%, O which compared favorably with the theoretical values for N-erucyl-6-hydroxy caproamide of 76.8%, C; 12.8%, H; 3.2%, N; and 7.25%, O. The observed molecular weight was 462, the theoretical being 438. The melting point of this product measured with a duPont 900 Thermal Analyzer and Differential Scanning Colorimeter cell was 86° C.

EXAMPLE 3

Preparation of N-erucyl-3-hydroxy propionamide

A 500 ml. 3 neck, ball joint flask equipped with a stirrer and apparatus for vacuum distillation was charged with 129.6 (0.416 mole) of erucyl amide which was melted in the flask by raising the temperature to 60° C. The mixture was stirred rapidly at 60° C. and a pressure of 20 millimeters for 1 hour to remove volatile matter. Then 50 ml. of propyl acetate was added. After this time the distillation apparatus was replaced by a reflux condenser and a solution of 15 grams (0.416 mole) of beta-propiolactone in 100 ml. of propyl acetate was added gradually over a 2 hour period at a rate of 0.5 to 1.0 ml. per minute at a temperature of 60° C. to 70° C. An exotherm was observed up about 5 to 10° C. Stirring was continued for an additional hour after which the reaction mixture was poured into a solvent mixture of 500 ml. of benzene and 300 ml. of acetone. The mixture was cooled to 20° C. at which point a light precipitate developed which was filtered and dried in a vacuum oven at 55° C. This product, N-erucyl-6-hydroxy propionamide, was recrystallized from isopropanol affording 20.6 grams of product. The structure was confirmed from its infra-red spectrum which showed strong substituted amide absorption bands near 6.1 and 6.5 microns and no evidence of carbonyl ester or acid bands at 5.75 or 5.83 microns respectively.

EXAMPLE 4

Preparation on N-erucyl-4-hydroxy butyramide

Example 3 was repeated with the exception that 50 g. (0.58 mole) of gamma-butyrolactone was substituted for the beta-propiolactone and 180.5 g. (0.58 mole) of erucyl amine was used with a total reaction time of 5 hours and a reaction temperature of 100° C. In this manner 37 grams of n-erucyl-4-hydroxy-butyramide was obtained.

EXAMPLE 5

Preparation of N-oleyl-4-hydroxy butyramide

Example 3 was repeated with the exception that 40 grams (6.465 moles) of gamma-butyrolactone was used in place of the beta-propiolactone and 113.2 grams (0.465 mole) of oleyl amine was used in place of the erucyl amine at a reaction temperature of 100° C. and a reaction time of 5 hours. No solvent was used for the addition of gamma-butyrolactone. Recrystallization afforded 70 grams of n-oleyl-4-hydroxy butyramide.

EXAMPLE 6

Preparation of N-behenyl-4-hydroxy butyramide

Example 3 was repeated with the exception that 50 grams (0.581 moles) of gamma-butyrolactone was used in place of beta-propiolactone and 186.0 grams (0.581 mole) of behenyl amine was usoed in place of erucyl amine at a reaction temperature of 100° C. and a reaction time of 5 hours. No solvent was used for the addition of gamma-butyrolactone. Recrystallization afforded a yield of 52 grams of n-behenyl-4-hydroxy butyramide.

EXAMPLE 7

Blend of polyethylene and N-erucyl-6-hydroxy caproamide

A blend of polyethylene having a density of 0.922 g./cc. and a melt index of 2.0 dg./min. and the N-erucyl-6-hydroxy caproamide prepared in Example 2 was fluxed on a 3" x 6" steamheated, 2 roll mill using a front roll temperature of 220° F. and a rear roll temperature of 150° F. in a ratio sufficient to afford a master batch having a concentration of 0.6% of the caproamide additive. The blend was then sheeted off, cooled and granulated to yield a resin form suitable for melt extrusion. The master batch further blended with sufficient polyethylene as above to afford a caproamide additive concentration of 0.2% based on the total blend composition was processed into a film by means of a small blown film line which employed a 1" National Rubber Machine Corporation extruder having a metering screw conventionally used for polyethylene type resins and a 2" Egan-type tubular die (0.222" die gap). The process conditions used for the extrusion of film are shown in Table 1.

TABLE 1

| | | |
|---|---|---|
| Barrel temperature 1 | ° F. | 250 |
| Barrel temperature 2 | ° F. | 325 |
| Adapter temperature | ° F. | 325 |
| Die temperature | ° F. | 350 |
| Screw speed | r.p.m. | 32 |
| Head pressure | p.s.i. | 1,000 |
| Take-off speed | ft./min. | 10 |
| Flat width | | 6¼" |
| Film thickness | mils. | 1¼ |
| Screw cooling | | no |
| Air ring cooling of bubble | | medium |

The blocking, slip and bloom properties were then measured and the data obtained entered in Table 2 together with Control A which, was polyethylene alone with no caproamide additive.

EXAMPLES 8–11

Polyethylene-amide blends

Using the blending and film extrusion methods described in Example 7, a series of blends of various ethylene homopolymers and additive amides were prepared and their blocking, slip and bloom properties measured.

The resultant data together with various controls are also presented in Table 2.

TABLE 2

| Example No. | Ethylene polymer | Additive identity and percent | COF [b] | Blocking force, g. [c] | Bloom [d] |
|---|---|---|---|---|---|
| 7 | Polyethylene [a] | N-erucyl-6-hydroxy caproamide, 0.2% | 0.12 | <10 | No. |
| Control A | do | None | 1.4 | >200 | |
| 8 | do | N-oleyl-6-hydroxy caproamide, 0.2% | 0.30 | <10 | No. |
| 9 | do [e] | N-erucyl-6-hydroxy caproamide, 0.2% | 0.16 | <10 | No. |
| 10 | do [a] | N-erucyl-4-hydroxy butyramide 0.1% | 0.24 | <10 | No. |
| 11 | do [a] | N-erucyl-6-hydroxy caproamide, 0.1% | 0.25 | <10 | No. |
| Control: | | | | | |
| B | do | Stearyl erucamide, 0.2% | 0.32 | 34 | Yes. |
| C | do | Erucamide, 0.2% | 0.10 | 68 | No. |
| D | do | N-ethanol erucamide, 0.2% | 0.38 | 56 | Yes. |
| E | do | N-ethanol oleamide, 0.2% | 0.67 | 62 | No. |
| F | do | N-erucyl-3-hydroxypropionamide, 0.1% | 0.68 | 64 | No. |

[a] Density=0.922; MI=2.0 dg./min.
[b] Coefficient of friction measured on outside, outside surfaces of flattened extrusion tube after 24 hours.
[c] Measured on outside, outside surfaces of flattened extrusion tube after 24 hours.
[d] Bloom rated subjectively as "yes" or "no".
[e] Density=0.935; MI=1.6 dg./min.

EXAMPLES 12–15

Ethylene/acrylic acid copolymer-amide additive blends

Using the blending and film extrusion methods described in Example 7, a series of blends of ethylene/acrylic acid copolymers and amide additives were prepared and their blocking, slip, and bloom properties measured. The resultant data together with various controls are presented in Table 3.

TABLE 3

| Example No. | Ethylene polymer | Additive identity and percent | COF [b] | Blocking force, g. [c] | Bloom [d] |
|---|---|---|---|---|---|
| 12 | (f) | N-behenyl-6-hydroxy caproamide, 0.2% | 0.39 | <10 | No. |
| 13 | (f) | N-oleyl-7-hydroxy caproamide, 0.2% | 0.34 | <10 | No. |
| 14 | (f) | N-erucyl-6-hydroxy caproamide, 0.2% | 0.34 | <10 | No. |
| 15 | (f) | N-erucyl-4-hydroxy butramide, 0.2% | 0.18 | <10 | No. |
| Control: | | | | | |
| G | (f) | None | 0.86 | >200 | |
| H | (f) | N-ethanol erucamide, 0.2% | 0.76 | 176 | No. |
| I | (f) | Erucamide, 0.2% | 0.82 | 136 | No. |
| J | (f) | Oleyl oleamide, 0.2% | 37 | 0.62 | |
| K | (f) | Stearyl erucamide, 0.2% | 0.33 | 24 | Yes. |
| L | (f) | N-stearyl-6-hydroxy caproamide, 0.2% | 0.65 | 30 | No. |
| M | (f) | N-ethanol stearamide, 0.2% | 0.75 | 56 | Yes. |
| N | (f) | N-erucyl-3-hydroxy propionamide, 0.2% | 0.68 | 189 | No. |

Footnotes (b) (c) (d) are as defined in Table 1.
(f) Ethylene/acrylic acid copolymer containing 4% acrylic acid and having a MI of 6 dg./min.

EXAMPLES 16–17

Ethylene/vinyl acetate copolymer-amide additive blends

Using the blending and film extrusion methods described in Example 3, a series of blends of ethylene/vinyl acetate copolymers and amide additives were prepared and their blocking, slip and bloom properties measured. The resultant data together with various controls are presented in Table 4.

EXAMPLE 18

Ethylene/ethyl acrylate copolymer-amide additive blends

Using the blending and film extrusion methods described in Example 3, two blends of ethylene/ethyl acrylate copolymer with amide additives were prepared and their blocking, slip and bloom properties compared with a Control containing no additive. These date are presented in Table 5.

TABLE 5

| Example No. | Ethylene polymer | Additive identity and percent | COF [b] | Blocking force, g. [c] | Bloom [d] |
|---|---|---|---|---|---|
| 18 | (i) | N-erucyl-6-hydroxy caproamide, 0.5% | 0.24 | <10 | No. |
| Control: | | | | | |
| T | (i) | Erucamide, 0.5% | 0.18 | >200 | No. |
| U | (i) | None | >2 | >200 | |

[i] Ethylene/ethyl acrylate copolymer containing 17% ethyl acrylate and having a MI of 6.0 dg./min.
Footnotes (b) (c) (d) are as defined in Table 1.

EXAMPLES 19–21

Ethylene/acrylic acid copolymer-amide additive blends

Using the blending and film extrusion methods described in Example 3, two blends of ethylene/acrylic acid copolymer with amide additives were prepared and their

TABLE 4

| Example No. | Ethylene copolymer | Additive identity | COF [b] | Blocking force, g. [c] | Bloom [d] |
|---|---|---|---|---|---|
| Control O | (g) | None | 1.9 | 174 | |
| 16 | (g) | N-erucyl-6-hydroxy caproamide, 0.2% | 0.14 | <10 | No. |
| Control: | | | | | |
| P | (g) | Erucamide, 0.2% | 1.11 | 72 | No. |
| Q | (g) | N-ethanol stearamide, 0.2% | 0.77 | 32 | Yes. |
| 17 | (h) | N-erucyl-6-hydroxy caproamide, 0.5% | 0.20 | 10 | No. |
| Control | | | | | |
| R | (h) | Erucamide, 0.5% | 0.46 | >200 | No. |
| S | (h) | None | 72.0 | >200 | |

(g) Ethylene/vinyl acetate copolymer having a vinyl acetate content of 3.5% and a MI of 0.8 dg./min.
(h) Ethylene/vinyl acetate copolymer having a vinyl acetate content of 18% and a MI of 2.0 dg./min.
(b) (c) (d) Are as defined in Table 1.

blocking, slip and bloom properties compared with a Control containing no additive and with other Controls. These data are presented in Table 6.

TABLE 6

| Example No. | Ethylene polymer | Additive identity and percent | COF | Blocking force, g. | Bloom |
|---|---|---|---|---|---|
| Control W | (j) | None | 0.67 | 45 | |
| 15 | (j) | N-erucyl-6-hydroxy caproamide, 0.15% | 0.16 | <10 | No. |
| 16 | (j) | N-oleyl-6-hydroxy caproamide, 0.15% | 0.23 | <10 | No. |
| Control: | | | | | |
| X | (j) | N-erucyl-3-hydroxy propionamide, 0.15% | 0.69 | 41 | No. |
| Y | (j) | N-ethanol oleamide, 0.15% | 0.74 | 34 | No. |
| Z | (j) | Erucamide, 0.15% | 0.67 | 35 | No. | j Ethylene/acrylic acid copolymer containing 2.1% acrylic acid and having an MI of 3.0 dg./min.

EXAMPLES 22–27

When Example 7 is repeated with the exception that the polyethylene is replaced by (a) normally solid ethylenepropylene copolymer containing about 5 to about 7% by weight, based on the total copolymer, of propylene copolymerized therein; (b) normally solid propylene-ethylene copolymer containing about 5 to 7% by weight, based on the total copolymer, of ethylene copolymerized therein; (c) normally solid polypropylene; (d) normally solid poly(butene-1); (e) normally solid poly(4-methylpentene-1); (f) normally solid ethylene-butene-1 copolymer containing about 3 to 5% by weight, based on the total copolymer, of butene-1 copolymerized therein; or (g) normally solid ethylene-hexene-1 copolymer containing up to about 2% by weight, based on the total copolymer, of hexene-1 copolymerized therein, comparable results are obtained.

Although the invention has been described in its preferred forms with a certain degree of particularity, it is understood that the present disclosure has been made only by way of example, and that numerous changes can be made without departing from the spirit and scope of the invention.

What is claimed is:

1. α-Olefin polymer compositions for forming films characterized by a low coefficient of friction, a low blocking force, and no blooming which comprises:
(a) α-olefin polymers selected from the group consisting of:
(i) normally solid polymers of at least one olefinically unsaturated aliphatic hydrocarbon having the formula:

$$CH_2=CHR''$$

wherein R'' is a monovalent radical selected from the group consisting of hydrogen and alkyl groups containing 1 to about 8 carbon atoms and having a density of about 0.88 to about 0.99;
(ii) normally solid ethylene/vinyl acetate interpolymers containing about 1 to 35% by weight of vinyl acetate copolymerized therein;
(iii) normally solid ethylene/acrylic acid interpolymers containing about 1 to 10% by weight of acrylic acid copolymerized therein;
(iv) normally solid ethylene/methacrylic acid interpolymers containing about 1 to 10% by weight of methacrylic acid copolymerized therein;
(v) normally solid ethylene/alkyl acrylate interpolymers containing about 1 to 35% by weight of alkyl acrylate copolymerized therein, wherein the alkyl group contains 1 to about 6 carbon atoms;
(vi) normally solid ethylene/alkyl methacrylate interpolymers containing about 1 to 35% by weight of alkyl methacrylate copolymerized therein, wherein the alkyl group contains 1 to about 6 carbon atoms; and (b) about 0.01 to 5.0% by weight, based upon the weight of 2-olefin polymer of an amide having the formula:

$$R-N(H)-C(=O)-R'-OH$$

wherein R is an alkenyl radical having 18 to about 22 carbon atoms and R' is a divalent saturated hydrocarbon radical containing 3 to about 5 carbon atoms.

2. Composition claimed in claim 1 wherein the α-olefin polymer is a normally solid polymer of at least one olefinically unsaturated aliphatic hydrocarbon having the formula:

$$CH_2=CHR''$$

wherein R'' is as defined above.

3. Composition claimed in claim 2 wherein the normally solid polymer is polyethylene having a density of about 0.91 to about 0.96 and a melt index of about 0.01 to about 1000 dg./min.

4. Composition claimed in claim 1 wherein the α-olefin polymer is polyethylene.

5. Composition claimed in claim 1 wherein the α-olefin polymer is an ethylene/vinyl acetate interpolymer.

6. Composition claimed in claim 1 wherein the α-olefin polymer is an ethylene/acrylic acid interpolymer.

7. Composition claimed in claim 1 wherein the α-olefin polymer is an ethylene/methacrylic acid interpolymer.

8. Composition claimed in claim 1 wherein the α-olefin polymer is an ethylene/alkyl acrylate interpolymer.

9. Composition claimed in claim 1 wherein the α-olefin polymer is an ethylene/alkyl methacrylate interpolymer.

10. Composition claimed in claim 1 wherein the amide is N-erucyl-6-hydroxy caproamide.

11. Composition claimed in claim 1 wherein the amide is N-oleyl-6-hydroxy caproamide.

12. Composition claimed in claim 1 wherein the amide is N-erucyl-5-hydroxy valeramide.

13. Composition claimed in claim 1 wherein the amide is N-erucyl-4-hydroxy butyramide.

References Cited

UNITED STATES PATENTS

| | | | |
|---|---|---|---|
| 3,489,705 | 1/1970 | Zmitrovis | 260—28.5 AV |
| 3,518,215 | 6/1970 | Apikos | 260—28.5 AV |
| 3,492,258 | 1/1970 | Kremer | 260—28.5 AV |
| 3,362,839 | 1/1968 | Weindel | 260—28.5 AV |
| 2,991,265 | 7/1961 | Clark | 260—32.6 PO |
| 3,104,232 | 9/1963 | Clark | 260—32.6 PO |
| 2,234,016 | 3/1941 | Woodhouse | 260—561 B |
| 2,898,301 | 8/1959 | Mayhew | 260—561 B |
| 3,250,719 | 5/1966 | Schmolka | 260—561 B |
| 3,396,137 | 8/1968 | Wharton | 260—28.5 A |

MORRIS LIEBMAN, Primary Examiner

P. R. MICHL, Assistant Examiner

U.S. Cl. X.R.

260—32.6 PQ, 404, 561 B